United States Patent [19]

Reighter

[11] 4,017,321

[45] Apr. 12, 1977

[54] VOID FREE ELECTRICAL CEMENT-CONCRETE

[75] Inventor: David H. Reighter, Roslyn, Pa.

[73] Assignee: I-T-E Imperial Corporation, Spring House, Pa.

[22] Filed: July 11, 1975

[21] Appl. No.: 595,179

[52] U.S. Cl. .................................. 106/98; 106/104
[51] Int. Cl.² ............................................. C04B 7/02
[58] Field of Search ............... 106/97, 98, 99, 104; 264/86, 87

[56] References Cited

UNITED STATES PATENTS

| | | | |
|---|---|---|---|
| 1,600,514 | 9/1926 | Seailles et al. | 106/97 |
| 3,151,995 | 10/1964 | Nemeth | 106/98 |

FOREIGN PATENTS OR APPLICATIONS

| | | | |
|---|---|---|---|
| 328,030 | 4/1930 | United Kingdom | 106/98 |

*Primary Examiner*—J. Poer
*Attorney, Agent, or Firm*—Ostrolenk, Faber, Gerb & Soffen

[57] ABSTRACT

Electrical insulation grade concrete is prepared by mixing the aggregate and cement with an excess of water and thereafter vacuum deaerating and vacuum dehydrating the resulting mixture.

9 Claims, 5 Drawing Figures

VOID FREE ELECTRICAL CEMENT-CONCRETE

BACKGROUND OF THE INVENTION

There has been sporadic interest in cement concretes as electrical insulators since about 1952. Recently, this interest has quickened due mainly to economic pressures brought about by the rise of costs of conventional porcelain and epoxy insulators.

One of the major problems in using concrete as an electrical insulator results from the fact that when the cement is mixed with the aggregate and water, air is of necessity entrained in the mixture. For example, normal Portland cements will entrain from 0.25 to 1.3 percent by volume of air. Of course, some cements are purposely formulated to entrain air, but for electrical insulation purposes, the air entrained in the concrete should be eliminated. Normally, the air pockets are not inter-connected as shown in FIG. 1, which is a photomicrograph of a white Portland cement concrete at 10× magnification. However, as the concrete ages, cracks often develop between the air pockets, as shown in FIG. 2, which is a photomicrograph of a white Portland cement concrete at 20× magnification. Obviously, the inter-connection of the electrically conducting air pockets caused by the cracks renders the concrete inappropriate for insulating applications.

Accordingly, it is the object of this invention to prepare an electrical grade concrete in which the air pockets usually inherent in the concrete will be eliminated.

This and other objects of the invention will become apparent to those skilled in the art from the following detailed description in which.

SUMMARY OF THE INVENTION

Figure 1:
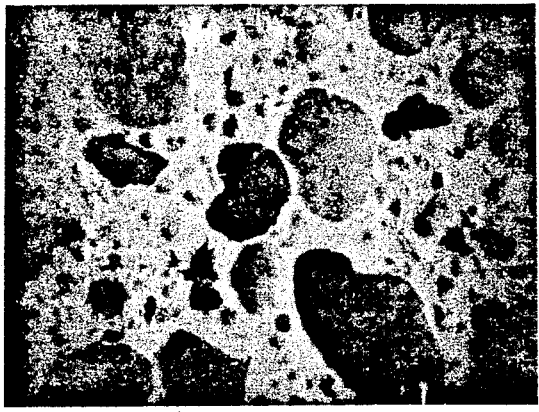
FIG. 1 is a photomicrograph of white Portland cement concrete at 10× magnification.
Figure 2:
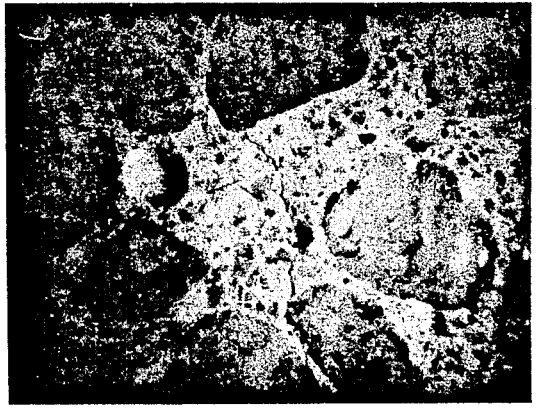
FIG. 2 is a photomicrograph of white Portland cement concrete at 20× magnification.

This invention relates to a composite insulating material for indoor and outdoor use on electrical power systems and more particularly relates to the production of an electrical insulation grade concrete by mixing the aggregate and cement with an amount of water in excess of that necessary to set the cement and thereafter vacuum deaerating and vacuum dehydrating the resulting mixture.

DESCRIPTION OF THE PREFERRED EMBODIMENT

The classic way to eliminate air pockets in a material is to apply a vacuum to the material. The reduced pressure expands the tiny bubbles, and they rise to the surface and break. In concrete, however, the high viscosity precludes such rising and breaking of the air pockets. Instead, the mass swells up and remains expanded until the vacuum is relieved at which time it sinks back while still retaining the air pockets. It has now been found that these air pockets can be eliminated if excess water is added to the cement-aggregate mixture so as to reduce the viscosity followed by vacuum-deaeration and vacuum dehydration.

The aggregate used in preparing the electrical insulation grade concrete of the instant invention is that normally used in preparing concrete. It is thus a conglommeration of broken stone, gravel, pebbles, glass-furnace slag or cinders, ceramics, sand, and the like. The conglommeration of materials forming the aggregate should have a variety of particle size to reduce the amount of volume which will be filled by the cement. Such volume will hereinafter be termed "voids". For example, theoretical hard sphere calculation indicates that a system of equal particle size will have 48% voids. Experimentally, No. 2 size Morie silica sand contains 40% voids. By using a variety of sizes, the void volume can be reduced to, e.g., 12%.

The cements used in forming the electrical insulation grade concrete of the present invention are those normally used in preparing concrete. Thus, for example, either Portland cement or Aluminous cement, or mixtures of Portland and Aluminous cements can be used. The particular cement employed will be chosen based on the particular end use application contemplated and it is preferred to use a cement which has the minimum amount of electrically conductive material within it. For example, the amount of iron oxide in type 1 Portland cement is approximately 10-times the amount typically found in white Portland cement (2.6% versus 0.25%). Known polymeric cements can also be employed if desired.

In accordance with conventional procedure, the curing agent, e.g., water, is added to the cement-aggregate mixture to cause hardening or setting. Typically the water is used at a ratio of about 1:0.4–1:0.5 of water:cement-aggregate. In the process of the present invention, an excess of water is added to reduce the viscosity of the mix to as low a value as is practical. In general, the mix will have a minimum slump of 6 inches which is achieved by adding the water in an amount of about 50%–80% excess, depending on the particular composition, sizing and dryness of the aggregate employed. Mixing of the cement constituents should be carried out to the greatest extent practical because the better the mixing, the better the electrical properties of the concrete.

If desired, an admixture or solution of water and another liquid, or even another liquid, can be used rather than water alone. The other liquid, e.g., ethylene glycol, should be inert to the extent that it does not cause the cement to set under the conditions of the instant process. In other words, the purpose of the excess water is to reduce viscosity; any other liquid which will also act in this manner can also be used even if that other liquid will cause, or be an adjunct to such causation, the concrete to set after completion of the instant process. Thus, the other liquid will also be removed during the dehydration step.

The cement mixture is then subjected to a vacuum sufficient to cause the entrained air to be removed but insufficient to boil the water at the prevailing temperature. The prevailing temperature is preferably ambient but higher or lower temperatures can be used if desired. In general, a vacuum of about 5–25 mm of mercury will be established and the vacuum will preferably be about 10–20 mm of mercury, most preferably 17.5 mm, at room temperature. The reduced pressure expands the air bubbles within the mixture and the reduced viscosity caused by the excess water permits the expanded bubbles to rise to the concrete surface and break.

When the vacuum deaeration process is complete, which generally takes about 2–5 minutes, preferably until no more air release is observed, the function of the excess water in reducing viscosity has been completed and the excess water constitutes a hindrance because it will impede and delay setting of the concrete. The deaerated concrete is cast into a mold of the desired shape, and the excess water over the stoichiometric amount required to cure the concrete is drawn off under vacuum using the principle employed in a buchner filter funnel. The reduced pressure used in this vacuum dehydration step can be the same as used in the vacuum deaeration step. Reduced pressures closer to ambient can be employed if desired with an obvious increase in time. When the excess amount of water has been removed, as determined by measurement, the vaccum is released and the cement cured in the conventional manner.

Figure 3:
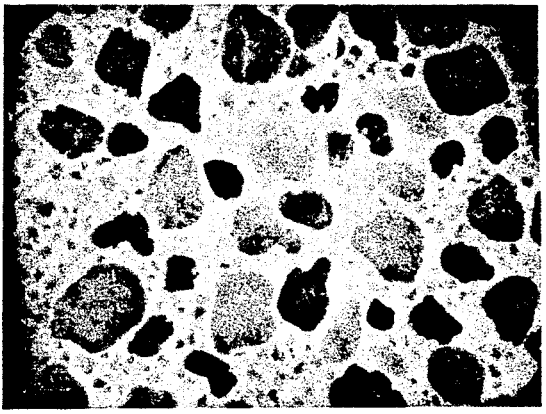
FIG. 3 is a photomicrograph of white Portland cement concrete of the present invention at 10× magnification.
Figure 4:
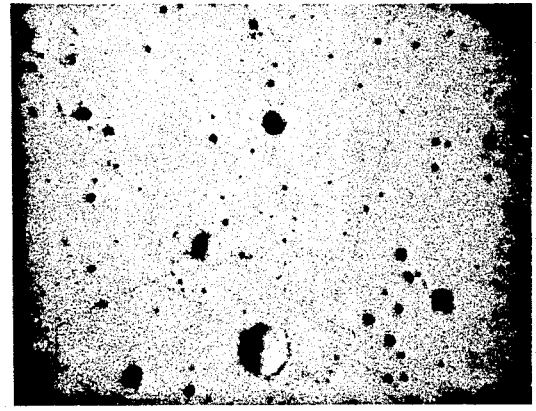
FIG. 4 is a photomicrograph of neat Portland cement showing air entrainment developed during normal mixing at 10× magnification.
Figure 5:
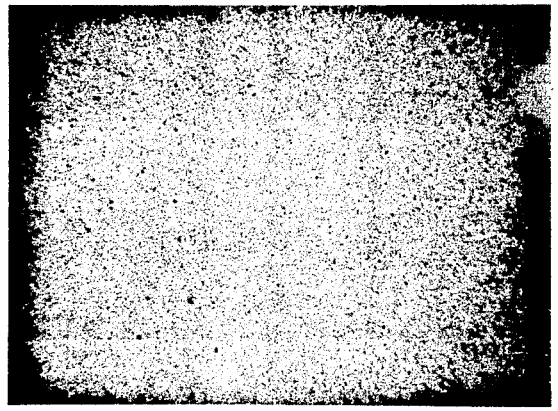
FIG. 5 is a photomicrograph of neat Portland cement prepared by the present process at 10× magnification.

The results of the instant process can be seen in the photomicrographs which constitute FIGS. 1–5 of this specification. FIGS. 1 and 3 are white Portland cement concrete at a 10-fold magnification and the absence of entrained air resulting from the instant process is readily visible in FIG. 3. FIGS. 4 and 5 are photomicrographs of neat Portland cement at a 10-fold magnification. FIG. 4 shows air entrainment developed during normal mixing of the cement and FIG. 5 shows that the entrained air has been removed by the process of the instant invention.

It will be appreciated that concrete prepared in accordance with the present process will be ostensibly air-pocket-free and this will eliminate the corona which will develop under electrical stress if the process had not been carried out. Moreover, dry concretes prepared in accordance with the present process are characterized by a low power factor of about 2%–3% at room temperature in contrast with a power factor of about 3%–5% at room temperature for concretes prepared in accordance with conventional procedure.

The process of this invention also improves the dissipation factor and dielectric constant of the dry concrete at elevated temperatures. Thus, neat white Portland cement samples were tested for dissipation factor and dielectric constant versus temperature and it was observed that the dissipation factor improved at temperatures over 70° C. and the dielectric constant was lower for samples prepared in accordance with the instant process. Similar tests were run on two samples of cement concrete of the same composition, one of which had been vacuum deaerated and vacuum dehydrated in accordance with the present process to optimum water content. It was found that the sample prepared in accordance with the instant method exhibited both improved dissipation factor and dielectric constant.

A typical example of an electrical insulation grade concrete prepared in accordance with the present invention is as follows 250 g of white Portland cement, 510 g of San Saba silica sand, 176 g of No. 2 Q Rok sand and 121 g of tap water were mixed well. The resulting concrete was moist air set for 24 hours followed by an additional 28 days under water. FIG. 1 is a photomicrograph of the cured concrete.

250 g of white Portland cement, 510 g of San Saba silica sand and 176 g of No. 2Q Rok were mixed well with 181 g of tap water. The resulting mix was then subjected to a vacuum of 15 mm of mercury for 3 minutes during which time the breaking of air bubbles on the surface could be observed. Thereafter, the excess water (60 g) were drawn off at the same reduced pressure. Ambient pressure was then re-established and the concrete cured as described in the preceding paragraph. FIG. 3 is a photomicrograph of the resulting concrete.

Various changes and modifications can be made in the process and products of this invention without departing from the spirit and the scope thereof. For example, it will be recognized that various fillers such as glass fibers, silica fibers and other inorganic fibers or laminar materials such as asbestos or mica can be incorporated into the concrete. The various embodiments of the invention disclosed herein were for the purpose of further illustrating the invention but were not intended to limit it.

I claim:

1. A method of producing electrical insulation grade concrete which comprises mixing aggregate, cement and an amount of an aqueous liquid in excess of the amount necessary to cause hardening of the concrete and sufficient to substantially reduce the viscosity of the mixture, applying a vacuum to the resulting mixture sufficient to remove entrained air therefrom, and thereafter removing the excess amount of aqueous liquid under vacuum.

2. The method of claim 1 wherein the aqueous liquid is water.

3. The method of claim 1 wherein the viscosity is reduced such that the mix has a minimum slump of 6 inches.

4. The method of claim 1 wherein a vacuum of about 5–25 mm of mercury is established.

5. The method of claim 4 wherein a vacuum of about 10–20 mm of mercury is established.

6. The method of claim 1 wherein the aqueous liquid is water, the viscosity is reduced such that the mix has a minimum slump of 6 inches, and a vacuum of about 10–20 mm of mercury is established.

7. The method of claim 6 wherein a vacuum of about 17.5 mm of mercury is established.

8. The method of claim 7 wherein the amount of water in excess is 50%–80%.

9. The method of claim 1 wherein the amount of aqueous liquid in excess is 50%–80%.

* * * * *